(12) United States Patent
Suresh et al.

(10) Patent No.: US 12,361,377 B2
(45) Date of Patent: *Jul. 15, 2025

(54) VOTING BASED PROXIMITY DETECTION AND RANGING

(71) Applicant: Hand Held Products, Inc., Charlotte, NC (US)

(72) Inventors: Sandeep Suresh, Bangalore (IN); Abhishek Mathur, Bangalore (IN); Vishnu Vardhan Reddy Beema, Bangalore (IN)

(73) Assignee: Hand Held Products, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,733

(22) Filed: Sep. 27, 2023

(65) Prior Publication Data

US 2024/0020640 A1    Jan. 18, 2024

Related U.S. Application Data

(63) Continuation of application No. 17/249,950, filed on Mar. 19, 2021, now Pat. No. 11,816,631.

(30) Foreign Application Priority Data

Feb. 4, 2021   (IN) .............................. 202111004866

(51) Int. Cl.
*G06Q 10/087*   (2023.01)
*G06K 7/10*    (2006.01)
*G06K 7/14*    (2006.01)

(52) U.S. Cl.
CPC ....... *G06Q 10/087* (2013.01); *G06K 7/10366* (2013.01); *G06K 7/10891* (2013.01); *G06K 7/1413* (2013.01); *G06K 2007/10534* (2013.01)

(58) Field of Classification Search
CPC ............. G06Q 10/087; G06K 7/10366; G06K 7/10891; G06K 7/1413;
(Continued)

(56) References Cited

U.S. PATENT DOCUMENTS 8,779,897 B2    7/2014  Ruizenaar et al.
11,816,631 B2 *  11/2023  Suresh ................. G06K 7/1413
(Continued)

FOREIGN PATENT DOCUMENTS

WO      2008/068358 A1    6/2008
WO      2017/223148 A1    12/2017
WO      WO-2020208412 A1 * 10/2020 ......... G06F 16/2379

OTHER PUBLICATIONS

Advisory Action (PTOL-303) Mailed on Nov. 29, 2022 for U.S. Appl. No. 17/249,950.
(Continued)

*Primary Examiner* — Russell S Glass
(74) *Attorney, Agent, or Firm* — Alston & Bird LLP

(57) ABSTRACT

A method for proximity detection and ranging with neighboring devices is described here. The method includes identifying, by a processor of a first tag, a second tag from a group of tags within a predefined range of the first tag. The method further comprises initiating, by the processor, transmission of a packet to the second tag in the group of tags identified within the predefined range. The method further comprises, in response to the transmission of the packet, receiving, by the processor, a response packet from the second tag. The method includes in response to receiving the response packet, determining a tag distance between the first tag and second tag. The method includes determining that the tag distance associated with the second tag is less than
(Continued)

a predefined distance, generating, by the processor, an alarm or notification to the first tag indicating that the predefined distance is crossed.

18 Claims, 8 Drawing Sheets

(58) Field of Classification Search
CPC ..... G06K 2007/10534; G06K 7/10297; G06K 7/10306; G06K 7/10386
USPC .......................................................... 705/28
See application file for complete search history.

(56) References Cited

U.S. PATENT DOCUMENTS

| | | | |
|---|---|---|---|
| 2004/0111335 A1 | 6/2004 | Black et al. | |
| 2006/0184376 A1 | 8/2006 | Graves et al. | |
| 2007/0268138 A1* | 11/2007 | Chung | G06Q 10/08 340/572.1 |
| 2009/0124304 A1* | 5/2009 | Twitchell, Jr. | H04W 84/18 455/574 |
| 2014/0148196 A1 | 5/2014 | Bassan-Eskenazi et al. | |
| 2014/0365194 A1* | 12/2014 | O'Hagan | G05B 15/02 703/11 |
| 2015/0362581 A1 | 12/2015 | Friedman et al. | |
| 2018/0293861 A1* | 10/2018 | Sarkar | G08B 13/1427 |
| 2020/0077246 A1 | 3/2020 | Mars et al. | |
| 2020/0106877 A1 | 4/2020 | Ledvina et al. | |
| 2020/0137676 A1 | 4/2020 | Yoon et al. | |
| 2021/0350555 A1 | 11/2021 | Fischetti et al. | |

OTHER PUBLICATIONS

Examiner Interview Summary Record (PTOL-413) Mailed on Nov. 17, 2022 for U.S. Appl. No. 17/249,950, 2 page(s).
Final Rejection Mailed on Sep. 15, 2022 for U.S. Appl. No. 17/249,950, 7 page(s).
Non-Final Rejection Mailed on Apr. 4, 2022 for U.S. Appl. No. 17/249,950, 6 page(s).
Non-Final Rejection Mailed on Feb. 9, 2023 for U.S. Appl. No. 17/249,950.
Notice of Allowance and Fees Due (PTOL-85) Mailed on Jun. 28, 2023 for U.S. Appl. No. 17/249,950, 7 pages.
Qorvo Blog Team. "Ultra-Wideband and Contact Tracing 101." Qorvo All Around, May 7, 2020 (3 pages), www.qorvo.com/design-hub/blog/ultra-wideband-and-contact-tracing. Accessed Jun. 4, 2021.

* cited by examiner

VOTING BASED PROXIMITY DETECTION AND RANGING

CROSS-REFERENCE TO RELATED APPLICATIONS

This application is a continuation of and claims priority to U.S. application Ser. No. 17/249,950, entitled "VOTING BASED PROXIMITY DETECTION AND RANGING" and filed Mar. 19, 2021, which claims priority to and the benefit of foreign Indian Provisional Patent Application No. 202111004866, filed on Feb. 4, 2021 with the Government of India Patent Office and entitled "Voting Based Proximity Detection and Ranging," which is incorporated herein by reference in its entirety.

TECHNOLOGICAL FIELD

Example embodiments described herein relate generally to systems, methods, and apparatuses for enabling a many-to-many communication and ranging between devices.

BACKGROUND

In commercial building, retail store, construction sites, warehouses, fulfillment centers, hospitals, etc., it is increasingly desirable for a system to be capable of performing proximity detection and distance calculation for contact tracing. There are multiple technologies that can be employed to perform contact tracing, but they might face various challenges of accuracy, power consumption, etc.

SUMMARY

The following presents a simplified summary to provide a basic understanding of some aspects of embodiments described herein. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a tag comprising a memory, a processor coupled to the memory and configured to perform the steps. The processor is configured to identify a group of tags within a predefined range of the tag. The processor then initiates transmission of packets to each tag in the group of tags identified within the predefined range. Further, the processor is configured to receive response packets from each of the tag among the group of tags, in response to the transmission of the packets. Furthermore, the processor then determines tag distances between the tag and each tag from the group of tags, in response to receiving the response packets from the group of tags. The processor of the tag then generates an alarm or notification corresponding to the tag from the group of tags, in response to determining that at least one tag distance is less than a predefined distance.

According to some example embodiments, a first tag comprising a memory, a processor coupled to the memory and configured to perform the steps. The processor is configured to identify a second tag from a group of tags within a predefined range of the first tag. The processor then initiates transmission of a packet to the second tag in the group of tags identified within the predefined range. Further, the processor is configured to receive a response packet from the second tag, in response to the transmission of the packet. Furthermore, the processor then determines a tag distance between the first tag and the second tag, in response to receiving the response packet. The processor of the tag then generates an alarm or notification to the first tag indicating that the predefined distance is crossed, in response to determining that the tag distance associated with the second tag is less than a predefined distance.

According to some example embodiments, the method comprising identifying, by a processor of a first tag, a second tag from a group of tags within a predefined range of the first tag. Further, the method includes initiating, by the processor, transmission of a packet to the second tag in the group of tags identified within the predefined range. Furthermore, the method includes in response to the transmission of the packet, receiving, by the processor, a response packet from the second tag. The method further comprises in response to receiving the response packet, determining a tag distance between the first tag and the second tag. Furthermore, the method includes in response to determining that the tag distance associated with the second tag is less than a predefined distance, generating, by the processor, an alarm or notification to the first tag indicating that the predefined distance is crossed.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
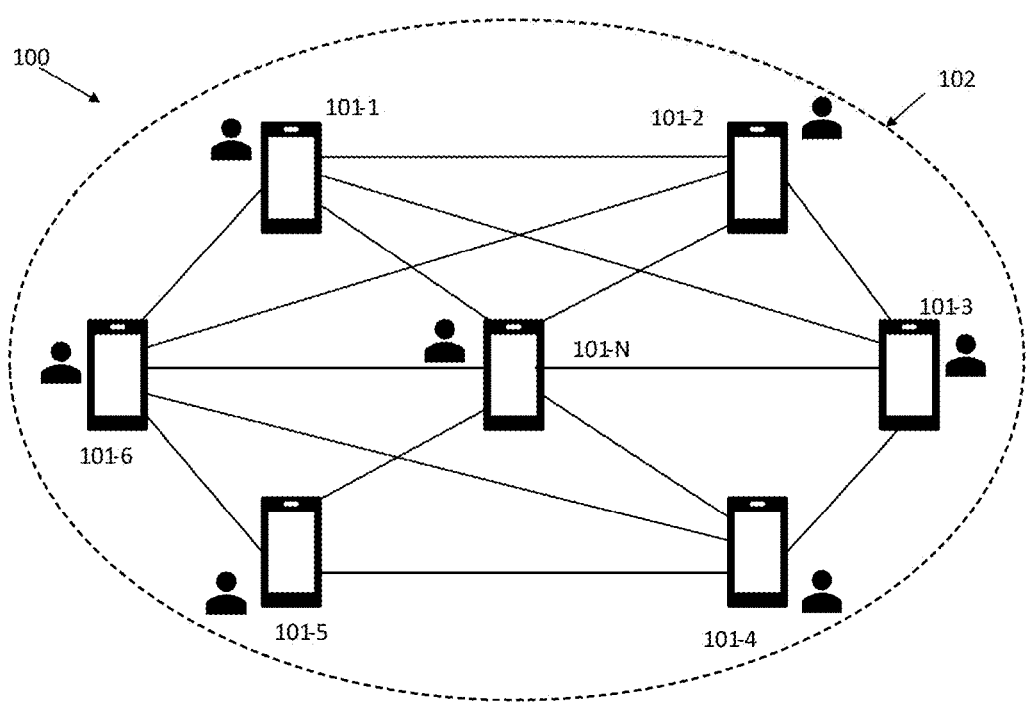
FIG. 1 illustrates a schematic of a system representing a many-to-many communication between electronic devices, according to an example embodiment.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

Generally, in a highly populated environment, such as warehouses, fulfilment centers, retail stores, it can be desirable to detect proximate electronic devices and calculate distance between the electronic devices. Each device can detect the other devices in vicinity or within a predefined range and can perform ranging. The term "ranging" here refers to calculating distance between the proximate electronic devices present within the predefined range. A communication can take place only between the devices that are identified with the predefined range. If any of the proximate electronic device identified within the predefined range crosses a threshold distance, an alert can be generated to let the user know that the particular electronic device has crossed the threshold distance.

In an example (e.g. in populated environment), it can be desirable to notify a user that the threshold distance is crossed by some device and thus, the user can take necessary action. For an example, in current pandemic situation, there is a need to maintain social distancing and further, to perform contact tracing. The worker, who may be working in a warehouse or other populated environment, might need to follow social distancing norms. This might enable the user to take action such as to move away and maintain a defined safe distance, thereby, reducing a risk. The defined safe distance can be country specific, i.e. each country may follow their own predefined safe distance for monitoring social distancing and contact tracing.

In an embodiment, the proximity detection and distance calculation between the electronic devices can be performed using a Bluetooth (BT) technology.

In an alternate embodiment, the proximity detection as well as calculating distance between the electronic devices can be performed using Ultra wide-band (UWB) technology. Technologies used for the proximity detection and distance calculation may not be only limited to Bluetooth or UWB technologies. Various other technologies can be employed such as wireless fidelity (WiFi), light fidelity (LiFi), wireless gigabit alliance (WiGig), Bluetooth low energy (BLE), ZigBee, near field communication (NFC), magnetic secure transmission, radio frequency (RF), Ultrasound, 5G mm wave technology, etc.

However, in some situation, using BT technology for distance calculation might not be accurate. The BT technology provides an advantage of low current consumption, and hence can be employed for neighbor discovery. Similarly, using UWB technology for neighbor discovery might suffer from higher current consumption. The advantage of UWB, i.e. distance accuracy, can be used to perform ranging between the devices in proximity. Therefore, the present disclosure can provide an efficient method of proximity detection using a BT radio module and calculating distance between the proximate electronic devices using a UWB radio module. Communication between the electronic devices can include at least one of 3rd generation (3G), long term evolution (LTE), 4th generation (4G), 5th generation (5G), wireless fidelity (WiFi), light fidelity (LiFi), wireless gigabit alliance (WiGig), Bluetooth, Bluetooth low energy (BLE), ZigBee, near field communication (NFC), magnetic secure transmission, radio frequency (RF), or body area network (BAN). However, the disclosure is not limited to the examples, and all available wireless communication technologies may be used as the communication using the second communication. Details of various example embodiments are described in reference to FIGS. 1-8 hereinafter.

The term "electronic device" used hereinafter refers to any or all of, handheld devices, mobile phones, wearable devices, personal data assistants (PDAs), portable devices, electronic tags, tablet computers, smart books, palm-top computers, barcode readers, scanners, indicia readers, imagers, Radio-frequency identification (RFID readers or interrogators), vehicle-mounted computers, wearable barcode scanners, wearable indicia readers, a point of sale (POS) terminal, headset devices, programmable logic controllers (PLCs), programmable automation controllers (PACs), industrial computers, laptop computers, desktop computers, personal computers, and similar electronic devices equipped with at least a processor configured to perform the various operations described herein.

The various embodiments are described herein using the term "computing platform" or "master device" used interchangeably for the purpose of brevity. The term "computing platform" can be used herein to refer to any computing device or a distributed network of computing device capable of functioning as a server, such as a master exchange server, web server, mail server, document server, or any other type of server. A computing platform may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smartphone, thereby enabling it to function as an Internet server (e.g., an enterprise e-mail server) only to the extent necessary to provide the functionality described herein.

In some example embodiments, the computing platform may correspond to any of, an industrial computer, a cloud computing-based platform, an external computer, a stand-alone computing device, and/or the like. In some example embodiments, the master device or the computing platform, can also refer to any of the electronic devices, as described herein. In some example embodiments, the computing platform can include an access point or a gateway device that can be capable of communicating directly with one or more electronic devices and can also be capable of communicating (either directly or alternatively indirectly via a communication network such as the Internet) with a network establishment service (e.g. Internet service provider). In some example embodiments, the computing platform can refer to a server system that can manage the deployment of one or more electronic devices throughout a physical environment. In some example embodiments, the computing platform may refer to a network establishment service including distributed systems where multiple operations are performed by utilizing multiple computing resources deployed over a network and/or a cloud-based platform or cloud-based services, such as any of a software-based service (SaaS), infrastructure-based service (IaaS) or platform-based service (PaaS) and/or like.

Referring now to FIG. 1, illustrated is a system 100 representing a many-to-many communication between electronic devices, according to an example embodiment. For example, the system 100 can include plurality of electronic devices 101-1 to 101-N in vicinity to each other and capable of communicating to each other in a mesh-of-mesh network topology. The term "electronic devices" used hereinafter can be referred to as tags, nodes, electronic portable devices, mobile devices, etc. A communication between the electronic device refers to direct communication between geographically adjacent electronic devices, without using infrastructure such as a base station or access point. The communication may use various frequency bands such as Wi-Fi Direct, Bluetooth, UWB, etc. The communication may totally include communication between not only simple devices embedded with a communication function but also communication between various types of devices such as smartphones or personal computers having a communication function. There can be one-to-one communication scheme by which one electronic device can communicate to only another electronic device, one-to-many communication scheme by which one electronic device can communicate with plurality of other electronic devices and many-to-many communication scheme in which one a plurality of electronic devices communicate with a plurality of other electronic devices.

The electronic devices 101-1 to 101-N referred herein can correspond to operator devices that may be used by operators (e.g. workers) in a work environment while performing various tasks. In a work environment, such as a warehouse, each operator device can communicate with other operator devices which are present within the predefined range. A plurality of electronic devices 101-1 to 101-N can be stationary or can be mobile in various embodiments. The electronic devices 101-1 to 101-N can together form a mobile mesh network 102 and the size of the mobile mesh network 102 can be dynamic—growing and shrinking in size as a function of time.

In some example embodiments, one or more electronic devices 101-1 to 101-N can have direct bi-directional communication with each other using one or more communication protocols such as, but are not limited to, Wi-Fi, Bluetooth, Bluetooth low energy (BLE), Zigbee, Ultrasonic frequency based network, and Z-Wave. In some examples, one or more electronic devices 101-1 to 101-N can communicate to each other via a network (not shown).

In this regard, a network can include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network can include a cellular telephone, an 802.11, 802.16, 802.20, and/or WiMax network. In some embodiments, BT may be used to communicate between the devices. Further, the network can include a public network, such as the Internet, a private network, such as an intranet, or combinations thereof, and may utilize a variety of networking protocols now available or later developed including, but not limited to TCP/IP based networking protocols.

In some example embodiments, the electronic devices 101-1 to 101-N may each be implemented as a computing device, such as a personal computer and/or other networked device, such as a cellular phone, tablet computer, mobile device, point of sale terminal, inventory management terminal etc. The depiction in FIG. 1 of "N" members is merely for illustration purposes. Furthermore, any number of users, operator devices may be included in the system 100. In one embodiment, the electronic devices 101-1 to 101-N may be configured to interact with a server (not shown). Further, in another embodiment, the electronic devices 101-1 to 101-N can communicate with the server via a gateway.

According to some example embodiments, the electronic devices 101-1 to 101-N can include, for example, but not be limited to, a mobile device or a voice-controlled apparatus (e.g. a headset device, a wearable head mounting device etc.). In this regard, an operator in the work environment can use the voice-controlled apparatus (herein referred to as the electronic device 101-1 to 101-N) to perform one or more operations in the work environment. For instance, in some example embodiments, the operator devices (herein referred to as the electronic device 101-1 to 101-N) can be used by operators to execute a workflow operation that can include one or more tasks. In this regard, in some examples, the workflow operation can include a sequence or series of steps to be performed by the operator.

In some example embodiments, the electronic devices 101-1 to 101-N can receive the file including the one or more workflows from the server (not shown).

Figure 2:
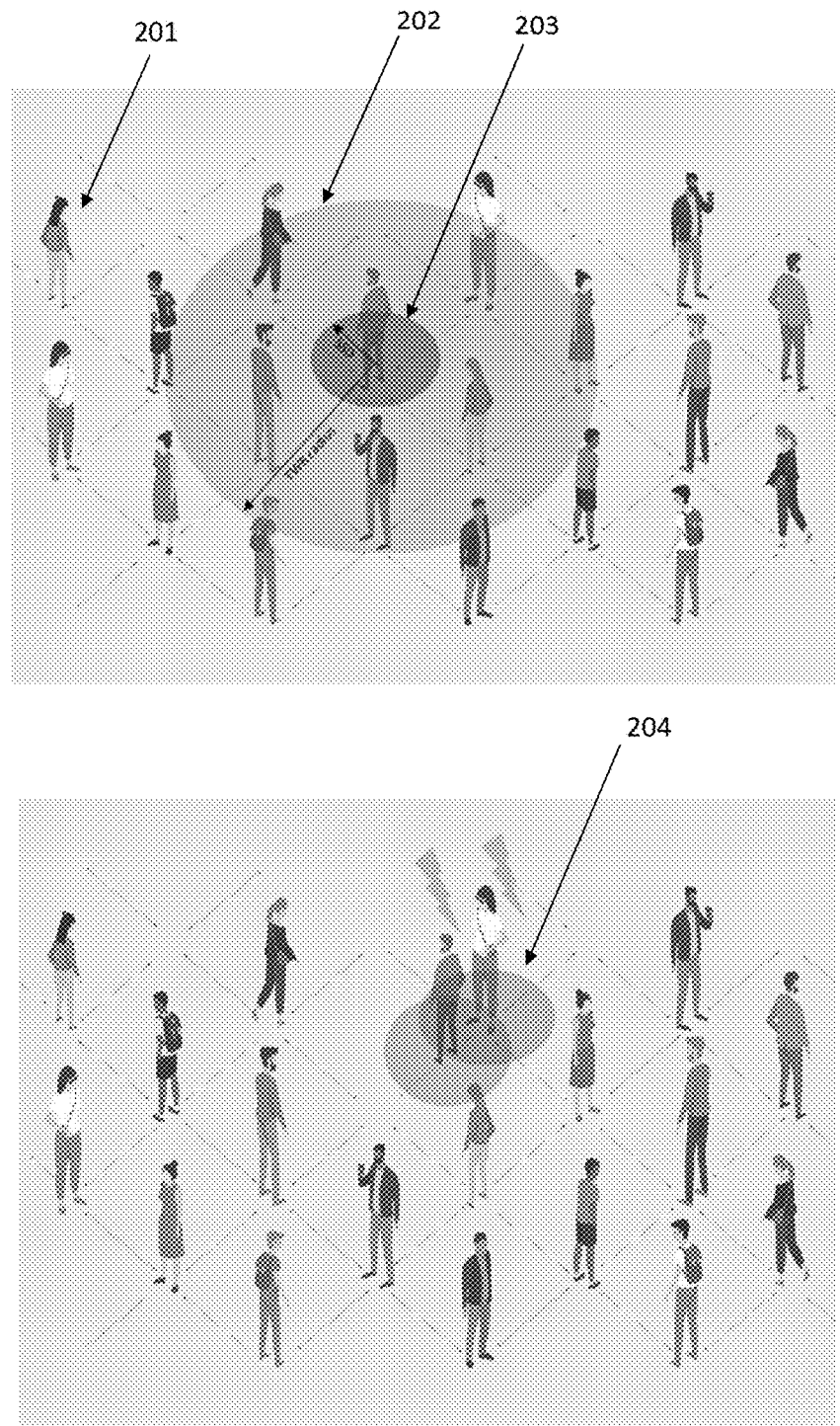
FIG. 2 illustrates an example scenario depicting proximity detection and alerting, according to an example embodiment.

FIG. 2 illustrates an example scenario for proximity detection and ranging, according to an example embodiment. As illustrated in FIG. 2 with reference to FIG. 1, the plurality of electronic devices 101-1 to 101-N can be carried by the plurality of users (for example, a user 201 carrying an electronic device 101-1). The term "electronic device" carried by a user can also be referred to as a tag worn by the user. In an example embodiment, a tag with BT and UWB capability can perform both neighbor discovery and ranging. A tag worn by the user 201 can determine the other tags in proximity, i.e. present within a predetermined range 202 and form a mobile mesh network 102 (as shown in FIG. 1). The tag, for example, carried by the user 201 can utilize a Blutooth (BT) radio module to detect the neighboring devices within the predetermined range 202. The tag worn by the user 201 may communicate only with the other tags that are identified within the predetermined range. Other tags present outside the predetermined range, can in some embodiments, may not be considered for ranging. Also, each of the tags can be referred to as nodes. Each tag worn by the user can have Bluetooth as well as UWB capability. The tag can determine a cluster within which the proximate tags are identified for communication and ranging. The term "cluster" herein refers to a group of tags identified within the predetermined range 202 of an area. Similarly, several clusters can be formed in an area depending upon the number of tags in proximity. Once the tags within the cluster are identified, the distance between the tags can be calculated. Each of the tags can be associated with a unique tag ID which can identify each of the tags uniquely. Further, a duration of communication between the tags within the cluster 202 is evaluated. The tag's identification information, duration of communication and distance between other tags can be stored in the memory of the tag. In an alternate embodiment, the tag's identification information, duration of communication and distance between tags can also be stored at the server.

In accordance with an example embodiment, if a tag determines that the other tag present within the cluster crossed (shown as numeral 204, in FIG. 2) a predefined distance 203, an alert is generated. The predefined distance 203 can be referred to as "safe social distance (SSD)" which can be variable or adjustable depending on geographical locations. For example, for Region A, the SSD can be 200 centimeters and for Region B, the SSD can be 100 centimeters. The predefined distance 203 can be fixed during the manufacturing of tag or can be varied by changing program code embedded in a memory of the tag. In an alternate embodiment, the predefined distance 203 can be provided by a central server that is in communication with the tag. The predetermined range 202 within which the tags are identified as neighbors can depend upon the predefined distance 203. The value of the predetermined range 202 can be greater than the predefined distance 203. Accordingly, transmission power of the tag can be controlled based on the predetermined range 202 and the predefined distance 203. Thus, the proposed method may provide transmission power saving to the tag.

Figure 3:
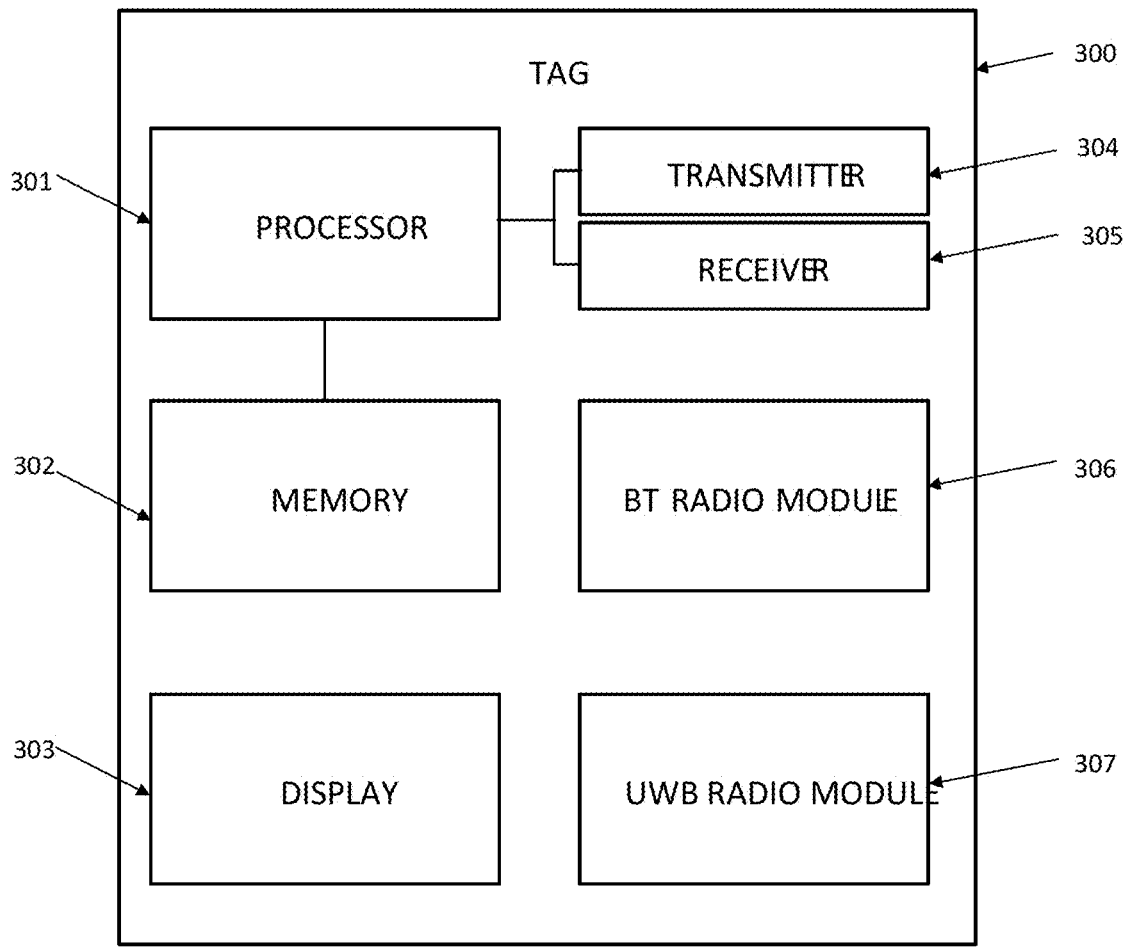
FIG. 3 illustrates a schematic block diagram of a tag, in accordance with one or more embodiments of the present disclosure

FIG. 3 illustrates a schematic block diagram of a tag. Tag 300 can include a processor 301, a memory 302, a display 303, a tag transmitter 304, a tag receiver 305, a Bluetooth (BT) radio module 306, and an Ultra wide-band (UWB) radio module 307, in accordance with the present disclosure. In an alternate embodiment, the BT radio module 306 and the UWB radio module 307 each can also include a transmitter and a receiver (not shown in FIG. 3) for enabling communication between a plurality of tags.

The memory 302 can be any type of storage medium that can be accessed by the processor 301 to perform various examples of the present disclosure. For example, the memory 302 can be a non-transitory computer-readable medium having computer-readable instructions (e.g., computer program instructions) stored thereon that are executable by the processor 301 to broadcast packets via the tag transmitter 304 and receive response packets from other tags via the tag receiver 305. Additionally, processor 301 can execute the executable instructions stored in memory 302 to activate, based on determining distance, a light in response to the other tag crossing a threshold distance of the tag, and display an alert message via display 303. In some embodiments, the tag may also include a rechargeable or long life battery, keypad, one or more speakers, vibrator, Bluetooth® antenna, UWB antenna and printed circuit board assembly (PCBA) electronics.

The memory 302 can be volatile or nonvolatile memory. The memory 302 can also be removable (e.g., portable) memory, or non-removable (e.g., internal) memory. For example, the memory 302 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 302 is illustrated as being located within tag 300, embodiments of the present disclosure are not so limited. For example, memory 302 can also be located internal to another computing resource (e.g., enabling computer-readable instructions to be downloaded over the Internet or another wired or wireless connection).

As described above, the processor 301 of the tag can switch on the BT radio module 306 for scanning and also emanate beaconing to the other tags in vicinity. As already mentioned above, the proximity detection may be performed using BT technology, since, the BT or BLE radios may have low receiver current consumption but also suffers location/distance measurement accuracy. The BT radio module 306 then identifies the other tags within the cluster. Once the proximity detection is done, the processor switches the control to the UWB radio module 307 for ranging. The UWB radio module 307 may be turned ON and distance between the tags identified within the cluster is calculated. In an embodiment, the distance between the tags and time interval for which the tags communicated are stored in the memory. In another embodiment, the processor 301 determines if the tag distance is less than a predefined distance. If the tag distance between the tag 300 and other proximate tag is less than the predefined distance, an alert is generated. The alert may comprise a visual indication via the display 303, an audio tone played through the one or more speaker, a haptic vibration, or an LED indication, etc. In an example embodiment, if the tag distance between the tag 300 and other proximate tag is less than the predefined distance, a record can be stored in the memory 302. The record can include duration of communication between the tag 300 and the other proximate tag.

Figure 4:
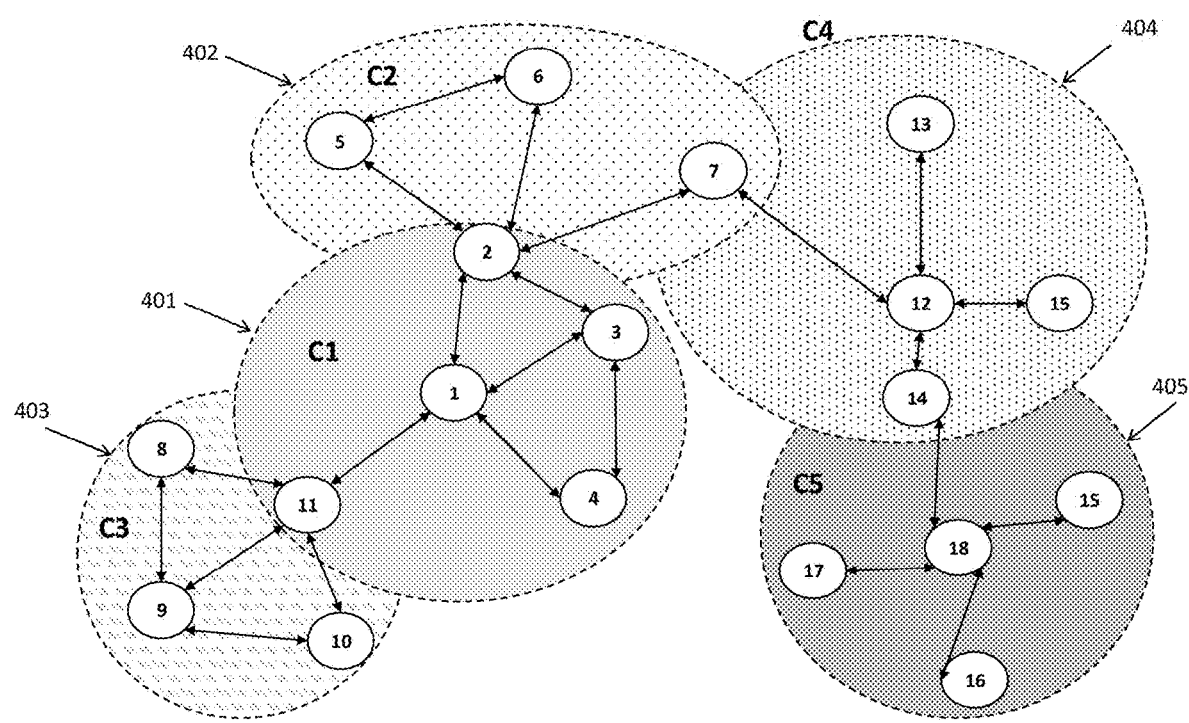
FIG. 4 illustrates an example scenario representing cluster formation using proximity detection, according to an example embodiment.

FIG. 4 illustrates an exemplary scenario representing cluster formation using proximity detection. In the embodiment illustrated in FIG. 4 with reference to FIG. 1, where the system 100 representing the populated environment includes the plurality of electronic devices 101-1 to 101-N. As explained with regards to FIG. 1, the electronic devices 101-1 to 101-N can be referred to as nodes or tags. In one or more example embodiments, the system 100 can comprise tags 1, 2, 3 . . . , and 18 and clusters (C1, C2, . . . C5) herein, shown as 401-405. Using a BT radio module, each of the tags 1-18 can starts beaconing at beacon interval and further, each of the tags can receive the beaconing information from other tags. In an example tag 1 can starts beaconing to other tags in a network and also, receive beaconing information from the other tags. Based on the received beaconing information using the BT radio module, clusters 401-405 can be formed. The clusters 401-405 can refers to a group of tags present within a predefined range. For example, cluster 401 comprises tags 1, 2, 3, 4, and 11 which can be detected as proximate neighbors, using BT technology. Similarly, cluster 402 can include tags 5, 6, 7 and 2 and so on. As mentioned already, the tags 1-18 may be mobile and dynamic in nature. Thus, each of the clusters 401-405 may overlap with each other due to presence of same tag between them. For example, tag 2 is present in both cluster 401 and cluster 402. In an example embodiment, the formation of clusters 401-405 can continue till all the tags in an area are ranged. Once the clusters 401-405 are formed by neighbor discovery, bi-directional communication links between the tags in the cluster may be established for communication and ranging. For example, in cluster 401, links are established between tags 1-2, 1-3, 1-4, 1-11, 2-3, and 3-4. Both the tags can communicate with each other in synchronization.

Figure 5:
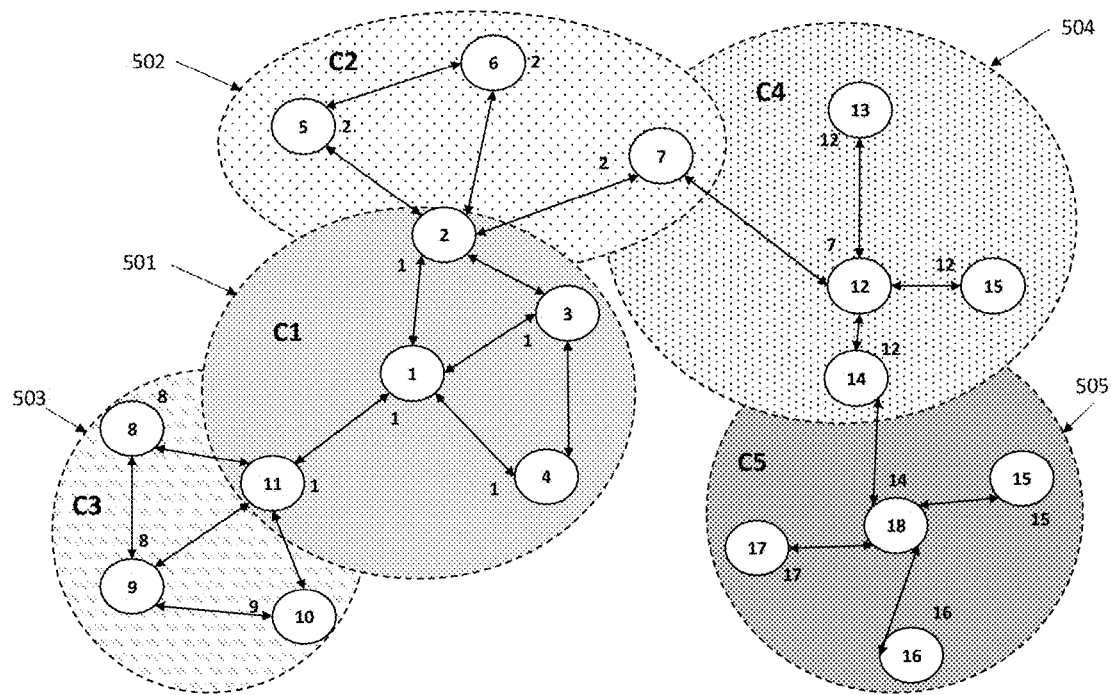
FIG. 5 illustrates an example scenario representing voting based leader tag election and ranging, according to an example embodiment.

FIG. 5 illustrates an example scenario representing voting based leader tag election and ranging. As already described in FIG. 4, the tags within each of the cluster 401-405 may be identified for ranging. The beaconing information of each of the tags 1-18 can include beacon payload, unique tag ID, time-stamps, and status byte information. A tag (for example, tag 1) from each of the clusters (for example, cluster 501) can be elected as a leader tag based on a voting from rest of the tags (for example, tags 2, 3, 4 and 11). As an example, in cluster 501, tags 1, 2, 3, 4 and 11 can send out beaconing information to each other and also, receives the beaconing from the other tags. Each of the tags (1, 2, 3, 4 and 11) can poll each other to elect a leader based on detecting a tag having the shortest address. The tag 1, herein for explanatory purpose, can be elected as the leader by nodes 2, 3, 4 and 11, as tag 1 may contain the shortest address in the cluster 501. The shortest address refers to a 2-byte address which can be present in the beacon payload of each of the tags 1-18. In an illustrative example, the tags 2, 3, 4, and 11 vote and elect tag 1 as the leader and send this information in their respective beacon payloads. The tag, in this case, tag 1 can be elected when all the other tags 2, 3, 4 and 11 or a majority of tags vote for tag 1. The tags cannot elect themselves as the leader. Furthermore, in an embodiment, the tag 1 elected as the leader can act as an initiator and rest of the tags 2, 3, 4 and 11 in cluster 501 may act as responder.

In the embodiment illustrated in FIG. 5, the tag 1 elected as the leader in cluster 501 can initiate broadcast of multicast or groupcast packets to the other tags 2, 3, 4 and 11. The packets are not limited to groupcast or multicast, but can be unicast packets, advertisement packets as well. In response to transmission of groupcast packets, the tags 2, 3, 4, and 11 in cluster 501 respond back by sending response packets. In an example embodiment, in response to tag 1 being elected as the leader, the processor of the tag switches on the UWB radio module for performing ranging. During ranging, tag distances between the elected leader tag and the other tags within the cluster is calculate. As an example, the UWB radio module in the tag 1 calculates distance between the tag 1 and each of the tags 2, 3, 4 and 11 in the cluster 501. In this regard, for an example, the distance between the tag 1 and tag 2, tag 1 and tag 3, tag 1 and tag 4, tag 1 and tag 11 can be calculated based on Time of flight (ToF) ranging algorithm and stored in the memory of the tag. Further, in an alternate embodiment, duration of communication between the tag 1 and each of the tags in cluster 501 may be stored in the memory along with the unique tag ID of the tags. Duration of communication between tags can be evaluated based on time-stamps associated with each of the tags.

In an embodiment, the memory of the tag can store information of each of the tags 1-18 and each of the cluster 501-505. The information may be stored as a record for future referencing. The record can be stored in a format, for example, (date/time stamp:Leader-Tag-ID:Neighbor-Tag-ID:distance:duration).

In an example embodiment, after the distance between the tag 1 and each of the tags 2, 3, 4 and 11 in the cluster 501 is calculated, the processor of the tag 1 may determine if a tag distance between tag 1 and other tag (either one of the tags 2, 3, 4 and 11) is less than the predefined distance. For example, if the tag distance between tag 1 and tag 2 determined to be less than the predefined distance, an alert or notification is generated to notify the user wearing tag 1. If the tag distance between tag 1 and tag 2 determined to be more than the predefined distance, the record is stored in the memory and the tags 1 and 2 transit to SLEEP state.

In another embodiment, the process of proximity detection and ranging in clusters 501-505 occurs concurrently. The process described above continues until ranging with all the tags completes. Once the ranging between the tags is completed, the tags can transit to SLEEP state. After transition to the SLEEP state, the tags can again wake-up and repeat the above process after every "INTERVAL DURATION" which can be determined based on battery life requirements of the tags. In an embodiment, the INTERVAL DURATION can typically be, but not limited to 200 milliseconds-1000 milliseconds.

In an example embodiment, if the tag 1 that is the leader tag shuts down or fails to communicate with rest of the tags 2, 3, 4 and 11 in cluster 501, the tags 2, 3, 4 and 11 may wait for a predefined period of time. If no response is received from the leader tag after the predefined period of time, the tags 2, 3, 4 and 11 can re-initiate the process of electing a new leader and ranging.

Figure 6:
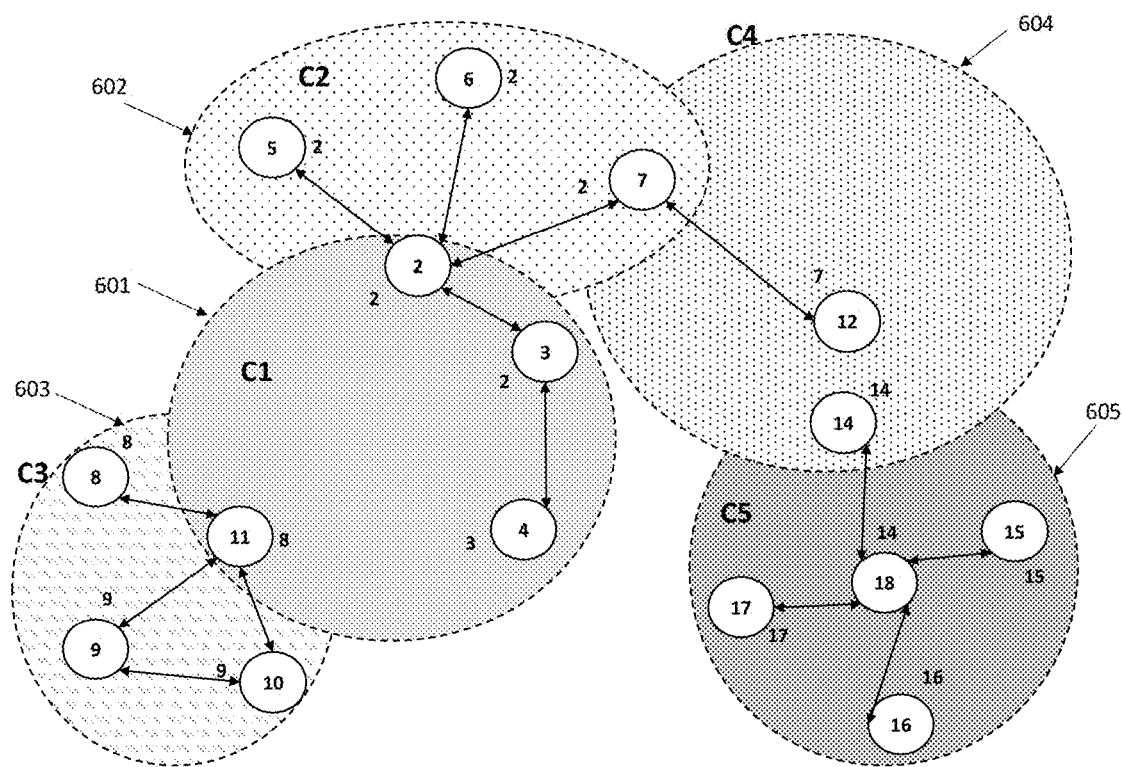
FIG. 6 illustrates an example scenario representing ranging completion, in accordance with an example embodiment.

FIG. 6 illustrates an example scenario representing ranging completion. In an embodiment, when the leader tag, for example, tag 1 completes ranging with the rest of the tags 2, 3, 4, and 11 in cluster 601, the tag 1 disappears from the cluster 601. Now, the tags 2, 3, 4, and 11 can elect a new leader tag so that the ranging between all the tags 2, 3, 4, and 11 completes. Similarly, as shown in FIG. 6, tag 1 from cluster 601, tags 13, 15 from cluster 604 disappeared as they have finished ranging with the neighboring tags. The process of cluster formation, proximity detection and ranging are continuous process, till all the tags in the given work environment are ranged.

In an example embodiment, if a new tag needs to be introduced in the cluster, the new tag checks the status byte of the tags present in the cluster. If the status byte is a non-zero value, the new tag may have to wait for some time until the on-going ranging completes. The non-zero value of the status byte may indicate busy state of the tags in the cluster. The new tag keeps checking the status byte of the tags until the status byte value becomes zero that indicates an IDLE state.

In an alternate embodiment, when the tag 1 and the other tags 2, 3, 4, and 11 finish the distance measurement, the tag 1 and the other tags 2, 3, 4, and 11 can transit to an UWB SLEEP state until a time of Next Ranging Duration comes. The UWB SLEEP state indicates a state in which an operation of measuring a distance by using an UWB is temporarily stopped.

Figure 7:
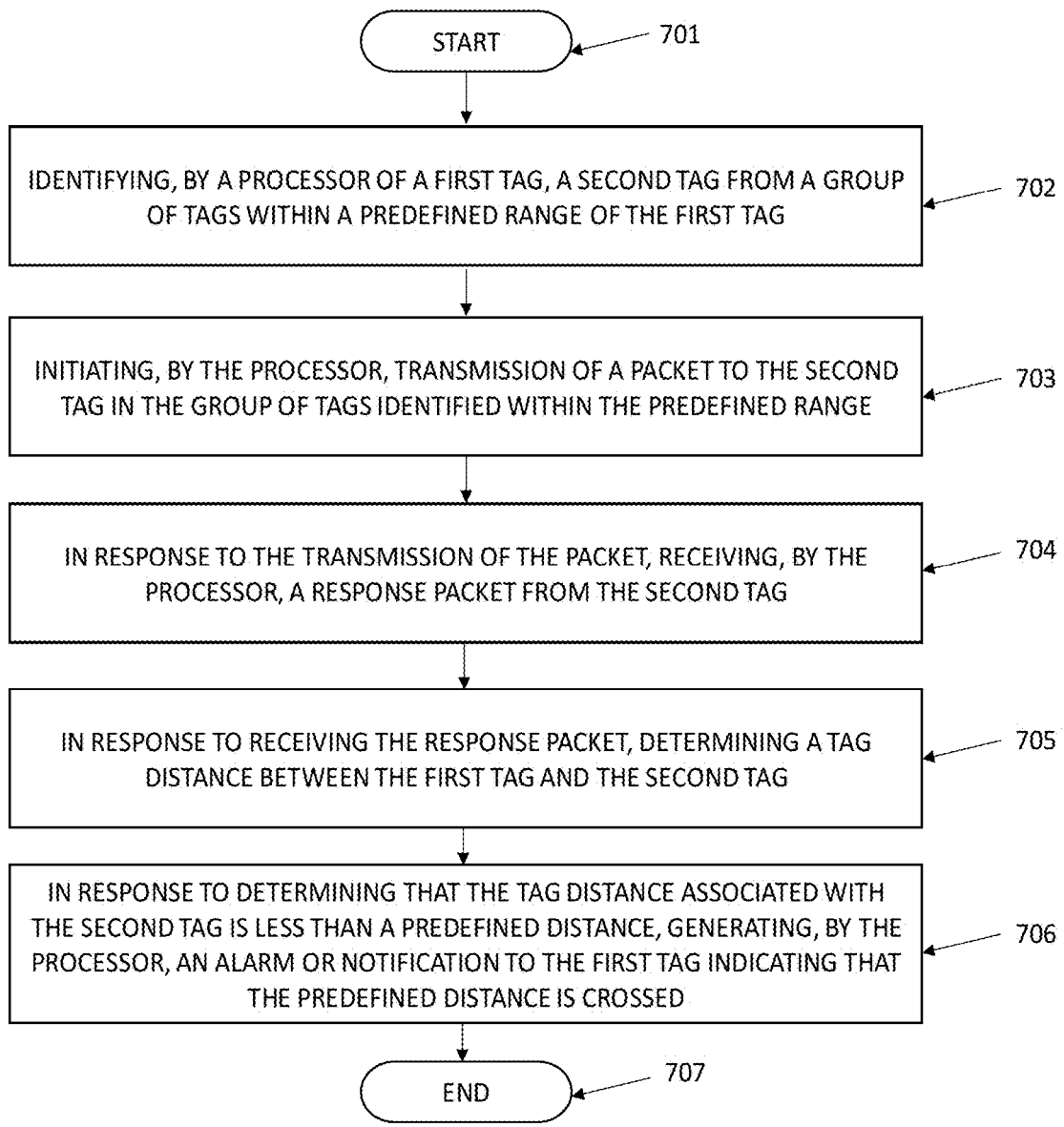
FIG. 7 illustrates a flow diagram representing a method for proximity detection and ranging with neighboring devices, in accordance with another example embodiment described herein.

FIG. 7 illustrates an exemplary embodiment of a method 700 of proximity detection and ranging with neighboring devices. The method 700 starts at step 701. At step 702, a first tag (e.g. the tag 1, in FIG. 4) can identify a second tag from a group of tags (e.g. the tags 2, 3, 4 and 11, in FIG. 4) within a predefined range of the first tag. In this regard, the predefined range can correspond to a cluster (referred as 401-405, in FIG. 4).

At step 703, the first tag can initiate transmission of a packet to the second tag in the group of tags identified within the predefined range. In this regard, as described earlier, the transmission of the packet can be initiated in response to the first tag being elected as a leader based on voting by the group of tags present within the predefined range. Further, in an exemplary embodiment, the first tag can communicate with the second tag, via a BT or BLE. In this regard, the first tag transmits the packet to the second tag via a transmitter (shown as, transmitter 304 in FIG. 3).

At step 704, the first tag can receive a response packet from the second tag, in response to transmission of the packet to the second tag. The first tag can receive the response packet from the second tag via a receiver (shown as, receiver 305 in FIG. 3). The processing control can then be transferred to step 705.

At step 705, in response to receiving the packet from the second tag, the first tag can determine a tag distance between the first tag and the second tag. In this regard, as described earlier, the tag distance can be calculated based on ToF (Time-of-Flight) ranging algorithm. The processing control can be transferred to step 706. The method described herein cannot be limited to ToF ranging algorithm but ranging can also be performed based on TDoA (Time Difference of Arrival), AoA (Angle of Arrival), Phase difference methods etc.

At step 706, the first tag can determine if the tag distance between the first tag and the second tag is less than a predefined distance. In an example, if the tag distance between the first tag and the second tag is less than a predefined distance, an alert or notification can be generated to the first tag indicating that the predefined distance is crossed by the second tag. In an embodiment, the predefined distance (shown as 203 in FIG. 2) can vary based on different geographical locations. As explained earlier, the alert or notification can comprise a visual indication via a display, an audio tone played through the one or more speaker, a haptic vibration, or an LED indication, etc. In an example embodiment, if the tag distance between the first tag and the second tag is less than a predefined distance, a record can be stored in a memory. The record can include unique tag IDs of both the first tag and the second tag, duration of communication between the first tag and the second tag along with respective timestamps. At step 707, the process ends.

Figure 8:
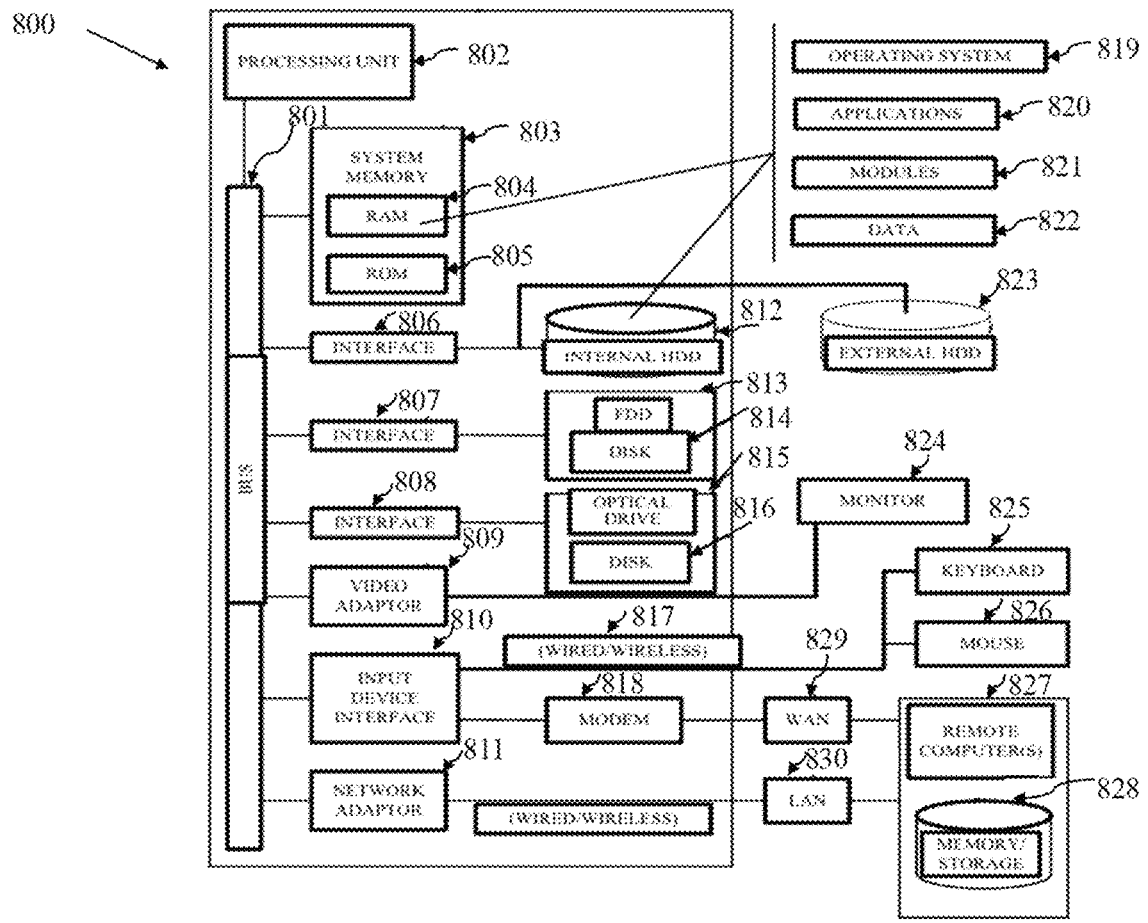
FIG. 8 illustrates a schematic view of another example electronic device used for performing proximity detection and ranging, in accordance with another example embodiment.

FIG. 8 illustrates a schematic view of another example of an electronic device 800, in accordance with another example embodiment described herein. According to some example embodiments, the electronic device 800 illustrated in FIG. 8 can correspond to the electronic devices 101-1 to 101-N, as described in reference to FIGS. 1-7.

Referring now to FIG. 8, there is illustrated a block diagram of operable to execute the functions and operations performed in the described example embodiments. In some example embodiments, the electronic device 800 can provide networking and communication capabilities between a wired or wireless communication network and a server and/or communication device. In order to provide additional context for various aspects thereof, FIG. 8 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

According to said example embodiments, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, mini-computers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

In accordance with some example embodiments, computing devices typically include a variety of media, which can include computer-readable storage media or communications media, which two terms are used herein differently from one another as follows.

According to some example embodiments, a computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In some examples, communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 8, implementing various aspects described herein with regards to the end-user device can comprise the electronic device (or referred as computing device 800) comprising a processing unit 802, a system memory 803 and a system bus 801. The system bus 801 can be configured to couple system components including, but not limited to, the system memory 803 to the processing unit 802. In some example embodiments, the processing unit 802 can be any of various commercially available processors. To this end, in some examples, dual microprocessors and other multi-processor architectures can also be employed as the processing unit 802.

According to some example embodiments, the system bus 801 can be any of several types of bus structure that can further interconnect to a memory bus (with or without a memory controller), a peripheral bus, and a local bus using any of a variety of commercially available bus architectures. In some examples, the system memory 803 can comprise, read-only memory (ROM) 805 and random-access memory (RAM) 804. According to some example embodiments, a basic input/output system (BIOS) is stored in a non-volatile memory 805 such as ROM, EPROM, EEPROM, which BIOS contains the basic routines that help to transfer information between elements within the computing device 800, such as during start-up. The RAM 804 can also comprise a high-speed RAM such as static RAM for caching data.

According to some example embodiments, the computing device 800 can further comprise an internal hard disk drive (HDD) 812 (e.g., EIDE, SATA), which internal hard disk drive 812 can also be configured for external use in a suitable chassis (not shown), a magnetic floppy disk drive (FDD) 813, (e.g., to read from or write to a removable diskette 814) and an optical disk drive 815, (e.g., reading a CD-ROM disk or, to read from or write to other high capacity optical media such as the DVD). In some examples, the hard disk drive 812, magnetic disk drive 813 and optical disk drive 815 can be connected to the system bus 801 by a hard disk drive interface 806, a magnetic disk drive interface 807 and an optical drive interface 808, respectively. According to some example embodiments, the interface 806 for external drive implementations can comprise, at least one or both of Universal Serial Bus (USB) and IEEE 1394 interface technologies. Other external drive connection technologies are within contemplation of the subject embodiments.

According to some example embodiments described herein, the drives and their associated computer-readable media provide nonvolatile storage of data, data structures, computer-executable instructions, and so forth. For the electronic device the drives and media accommodate the storage of any data in a suitable digital format. Although the description of computer-readable media above refers to a HDD, a removable magnetic diskette, and a removable optical media such as a CD or DVD, it may be appreciated by those skilled in the art that other types of media which are readable by an electronic device, such as zip drives, magnetic cassettes, flash memory cards, cartridges, and the like, can also be used in the example operating environment, and further, that any such media can contain computer-executable instructions for performing the methods of the disclosed embodiments.

In some example embodiments, a number of program modules can be stored in the drives and RAM 804, including an operating system 819, one or more application programs 820, other program modules 821 and program data 822. To this end, in some examples, all or portions of the operating system, applications, modules, and/or data can also be cached in the RAM 804. It is to be appreciated that the various embodiments can be implemented with various commercially available operating systems or combinations of operating systems.

According to some example embodiments, a user can enter commands and information into the computing device through one or more wired/wireless input devices, e.g., a keyboard 825 and a pointing device, such as a mouse 826. Other input devices (not shown) can include a microphone, an IR remote control, a joystick, a game pad, a stylus pen, touch screen, or the like. In some examples, these and other input devices are often connected to the processing unit 802 through an input device interface 810 that is coupled to the system bus 801, but can be connected by other interfaces, such as a parallel port, an IEEE 1384 serial port, a game port, a USB port, an IR interface, etc.

According to some example embodiments, a monitor 824 or other type of display device can also be connected to the system bus 801 through an interface, such as a video adapter 809. In addition to the monitor 824, the computing device 800 can also comprise other peripheral output devices (not shown), such as speakers, printers, etc.

According to some example embodiments, the computing device 800 can operate in a networked environment using logical connections by wired and/or wireless communications to one or more remote computers, such as a remote computer(s) 827. In some examples, the remote computer(s) 827 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 828 is illustrated. According to some example embodiments, the logical connections depicted include wired/wireless connectivity to a local area network (LAN) 830 and/or larger networks, e.g., a wide area network (WAN) 829. Such LAN and WAN networking environments are commonplace in offices and companies, and facilitate enterprise-wide computer networks, such as intranets, all of which may connect to a global communications network, e.g., the Internet.

In some examples, when used in a LAN networking environment, the computing device 800 can be connected to the LAN 830 through a wired and/or wireless communication network interface or adapter 811. The adapter 811 may facilitate wired or wireless communication to the LAN 830, which may also include a wireless access point disposed thereon for communicating with the wireless adapter 811.

In alternate examples, when used in a WAN networking environment, the computing device 800 can include a modem 818, or can be connected to a communications server on the WAN 829 or has other means for establishing communications over the WAN 829, such as by way of the Internet. The modem 818, which can be internal or external and a wired or wireless device, is connected to the system bus 801 through the input device interface 810. In a networked environment, program modules depicted relative to the computer, or portions thereof, can be stored in the remote memory/storage device 828. It will be appreciated that the network connections shown are exemplary and other means of establishing a communications link between the computers can be used.

According to some example embodiments, the computing device 800 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can further comprise at least Wi-Fi and Bluetooth™ wireless technologies. Thus, the communication can be a predefined structure as with a conventional network or simply an ad hoc communication between at least two devices.

In accordance with some example embodiments, Wi-Fi, or Wireless Fidelity, allows connection to the Internet from a couch at home, a bed in a hotel room, or a conference room at work, without wires. To this end, Wi-Fi referred herein, is a wireless technology similar to that used in a cell phone that enables such devices, e.g., computers, to send and receive data indoors and out; anywhere within the range of a base station. Wi-Fi networks use radio technologies called IEEE802.11 (a, b, g, n, ac, ax, ah etc.) to provide secure, reliable, fast wireless connectivity. Further, in accordance with some example embodiments described herein, a Wi-Fi network can be used to connect computers or the plurality of electronic devices to each other, to the Internet, and to wired networks (which use IEEE802.3 or Ethernet). Wi-Fi networks operate in the unlicensed 2.4, 5 and 6 GHz radio bands, at an 11 Mbps (802.11b) or 54 Mbps (802.11a) data rate, for example, or with products that contain both bands (dual band), so the networks can provide real-world performance similar to the basic "9BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms.

Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A tag comprising:
a memory comprising a set of instructions; and
a processor coupled to the memory, wherein the processor is configured to execute the set of instructions to:
identify a group of tags within a predefined range of the tag;
receive packets from a leader tag of the group of tags, wherein the leader tag is elected based on voting by the group of tags within the predefined range of the tag;
if no response is received from the leader tag for a predefined period of time, re-initiate election of a new leader tag of remaining tags in the group of tags, wherein the new leader tag initiates transmission of the packets to the remaining tags in the group of tags.

2. The tag according to claim 1, wherein the tag further comprises a BT radio module and a UWB radio module coupled to the processor.

3. The tag according to claim 2, wherein the group of tags are identified within the predefined range of the tag using the BT radio module and a tag distance between the leader tag and each tag of the group of tags is determined using the UWB radio module.

4. The tag according to claim 3, wherein the tag distance between the leader tag and each tag of the group of tags is calculated based on a Time-of-flight (ToF) ranging algorithm.

5. The tag according to claim 3, wherein the tag is configured with a predefined distance depending on geographical locations.

6. The tag according to claim 5, wherein the predefined range is determined based on the predefined distance, and wherein a value of the predefined range is greater than the predefined distance.

7. The tag according to claim 1, wherein the tag, upon receiving a packet, acts as a responder, and wherein acting as the responder comprises responding to the leader tag with a unique tag ID and a time stamp.

8. The tag according to claim 1, wherein the tag communicates with the group of tags through a wireless interface.

9. A tag comprising:
a memory comprising a set of instructions; and
a processor coupled to the memory, wherein the processor is configured to execute the set of instructions to:
transmit packets to other tags, wherein the tag is a leader tag elected based on voting by the other tags;
determine if a distance from the other tags is greater than a predefined distance;
if the distance from the other tags is greater than the predefined distance, transit the tag to a SLEEP state and store a record in the memory.

10. The tag according to claim 9, wherein the processor is configured to terminate the SLEEP state for a predefined period, and wherein the processor is configured to re-initiate determining the distance from the other tags in response to terminating the SLEEP state.

11. The tag according to claim 10, wherein the processor is configured to determine the predefined period based on a remaining battery life of the tag.

12. A method for operating a tag, the method comprising:
transmitting packets to a leader tag elected based on voting by the tag;
determine if a distance from the leader tag is greater than a predefined distance;
in response to the distance from the leader tag being greater than the predefined distance, transit the tag to a SLEEP state and store a record in a memory of the tag;
terminate the SLEEP state for a predefined period; and
initiate determining the distance from the leader tag in response to terminating the SLEEP state.

13. The method of claim 12, wherein the tag, upon receiving a packet, acts as a responder and the leader tag acts as an initiator, and wherein acting as the responder comprises responding to the leader tag with a unique tag ID and a time stamp.

14. The method of claim 12, wherein the leader tag is within a predefined range determined based on the predefined distance, and wherein a value of the predefined range is greater than the predefined distance.

15. The method of claim 12, wherein the leader tag communicates with the tag through a wireless interface.

16. The method of claim 12, wherein the tag further comprises a BT radio module and a UWB radio module coupled to a processor.

17. The method of claim 12, wherein the tag remains in the SLEEP state for a predefined sleep period, and wherein the tag wakes up and determines the distance from the leader tag after the predefined period.

18. The method of claim 12, wherein a period of SLEEP state is determined based on a battery life of the tag.

* * * * *